United States Patent [19]
Korthuis et al.

[11] Patent Number: 6,070,402
[45] Date of Patent: Jun. 6, 2000

[54] HARVESTING SYSTEMS AND METHODS

[75] Inventors: Donald L. Korthuis; Kenneth Buist, both of Lynden, Wash.

[73] Assignee: Korvan Industries, Inc., Lynden, Wash.

[21] Appl. No.: 09/129,972

[22] Filed: Aug. 5, 1998

Related U.S. Application Data

[60] Provisional application No. 60/074,471, Feb. 12, 1998.

[51] Int. Cl.[7] .................................................. A01D 34/00
[52] U.S. Cl. ............................................ 56/330; 56/327.1
[58] Field of Search ......................... 56/330, 329, 327.1; 180/215, 210

[56] References Cited

U.S. PATENT DOCUMENTS

| | | |
|---|---|---|
| 1,323,928 | 12/1919 | Tervo . |
| 1,629,831 | 5/1927 | Maglathlin . |
| 1,725,382 | 8/1929 | Trufant . |
| 2,671,301 | 3/1954 | Harrison .................................... 56/330 |
| 2,783,605 | 3/1957 | Heleen ...................................... 56/330 |
| 3,455,406 | 7/1969 | Soteropulos ............................. 180/27 |
| 3,672,140 | 6/1972 | Furford .................................... 56/330 |
| 4,141,203 | 2/1979 | Keillor .................................. 56/328.1 |
| 4,179,873 | 12/1979 | Scudder ................................. 56/328.1 |
| 4,286,426 | 9/1981 | Orlando et al. ........................ 56/340.1 |
| 4,299,081 | 11/1981 | Harris et al. ........................... 56/340.1 |
| 4,750,322 | 6/1988 | Korthuis ................................ 56/328.1 |
| 4,970,850 | 11/1990 | DeVries .................................... 56/15.5 |
| 4,972,662 | 11/1990 | Korthuis et al. .......................... 56/330 |
| 4,974,404 | 12/1990 | Korthuis et al. ....................... 56/328.1 |
| 4,976,094 | 12/1990 | Williamson et al. .................. 56/328.1 |
| 4,982,559 | 1/1991 | Calais ..................................... 56/328.1 |
| 5,027,593 | 7/1991 | Korthuis et al. ....................... 56/328.1 |

*Primary Examiner*—Thomas B. Will
*Assistant Examiner*—Meredith C. Petravick
*Attorney, Agent, or Firm*—Michael R. Schacht; Hughes & Schacht, P.S.

[57] ABSTRACT

A system for harvesting fruit from vertical plants arranged in rows. The system comprises a frame having two frame portions arranged on opposite sides of a given row during harvesting. A front wheel and one back wheel are mounted on one of the frame portions, and the other back wheel is mounted on the other wheel portion. A shaker system and collecting system are arranged on the frame to dislodge and collect the fruit. The collecting system defines an entryway through which the plants pass relative to the harvesting system during harvesting. The front wheel is arranged forward of the entryway and significantly increases the maneuverability of the harvesting system.

20 Claims, 15 Drawing Sheets

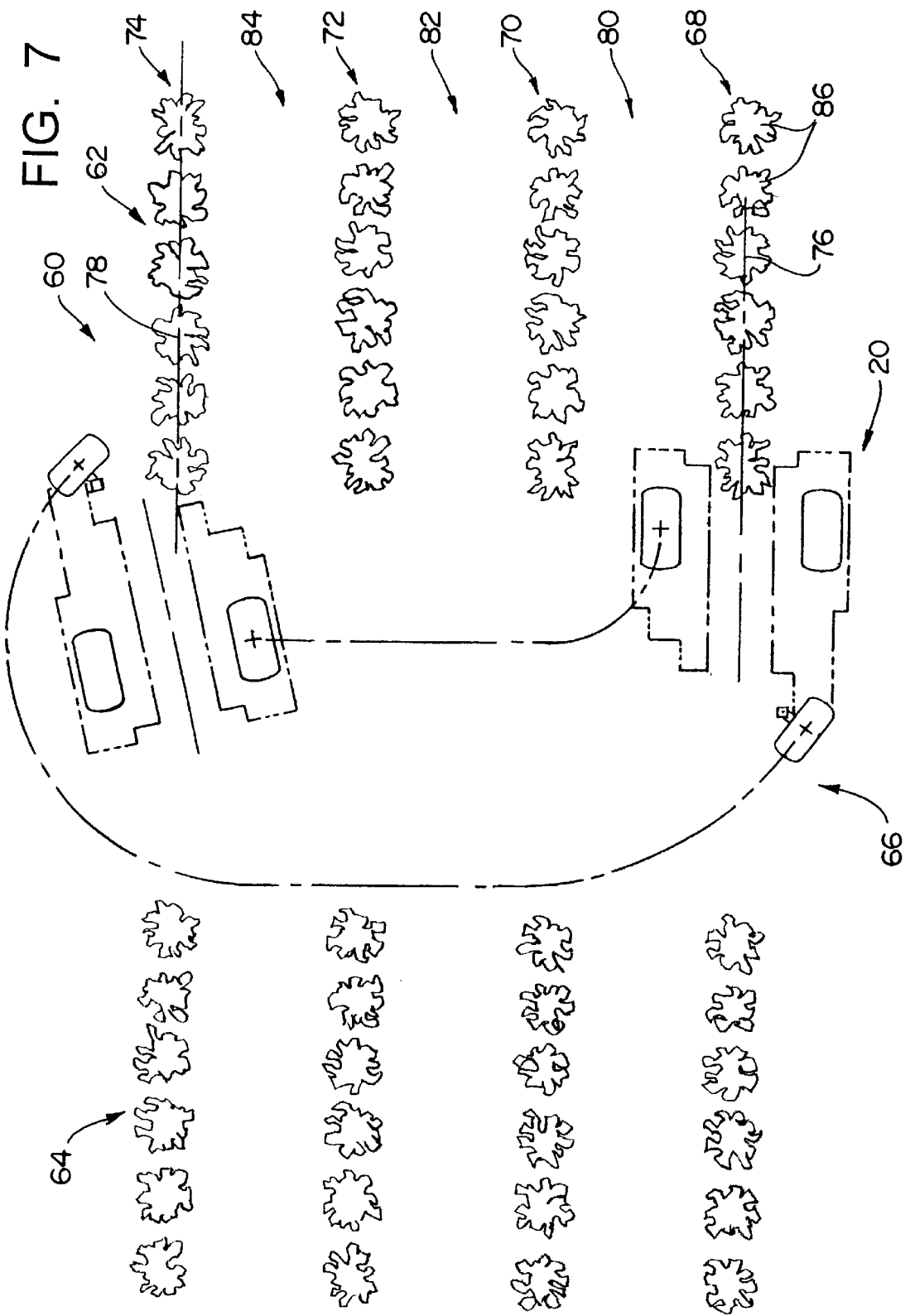

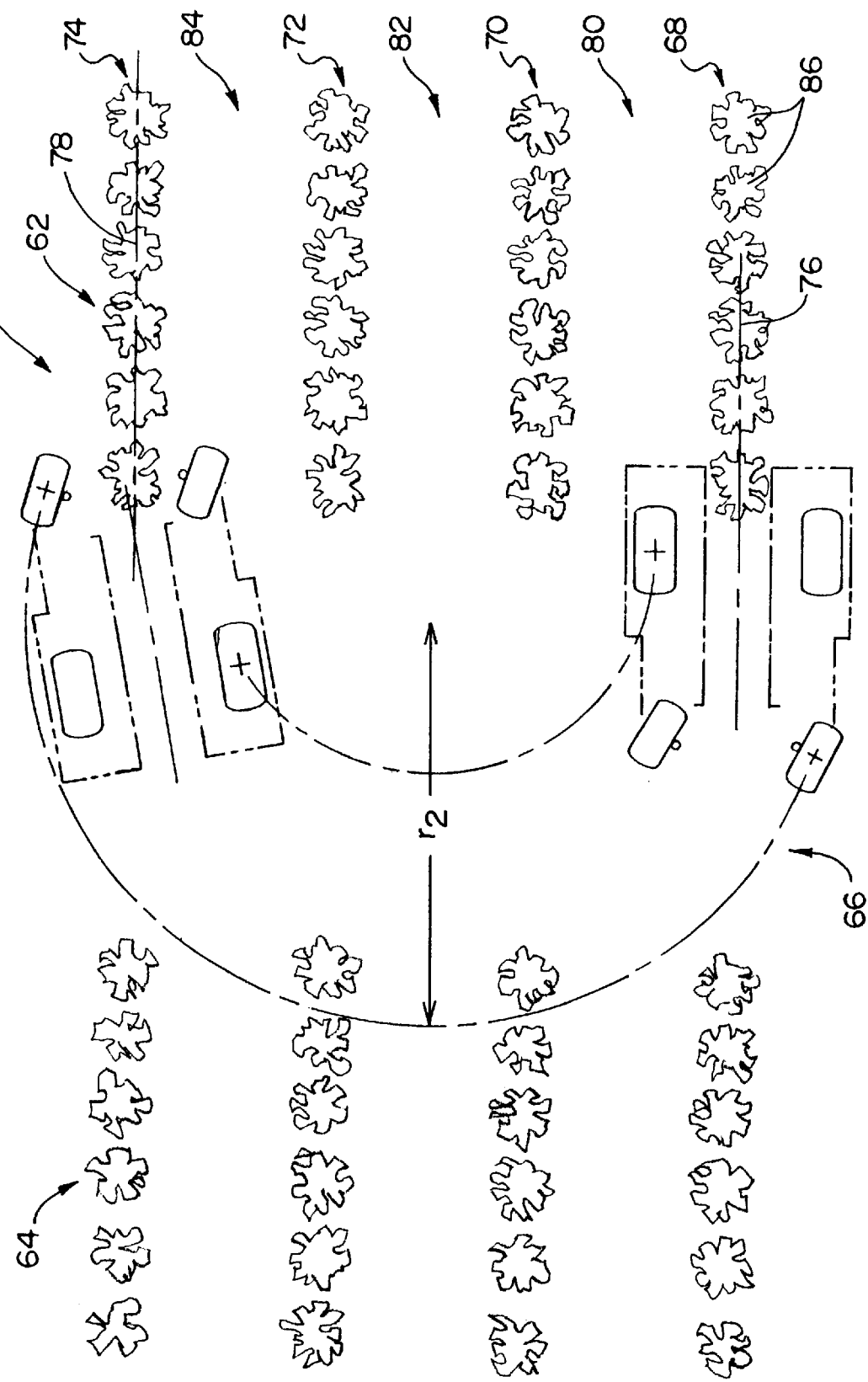

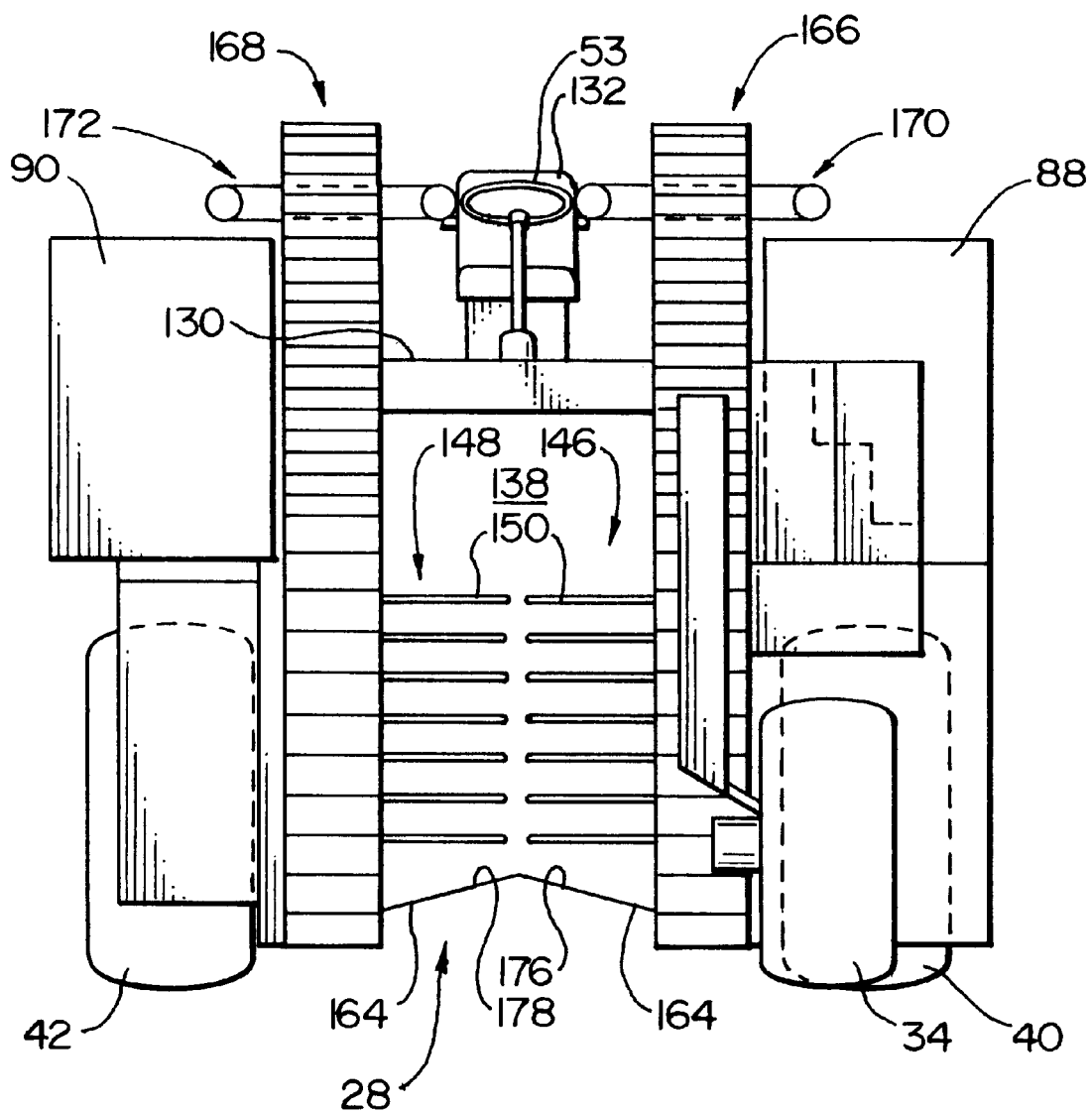

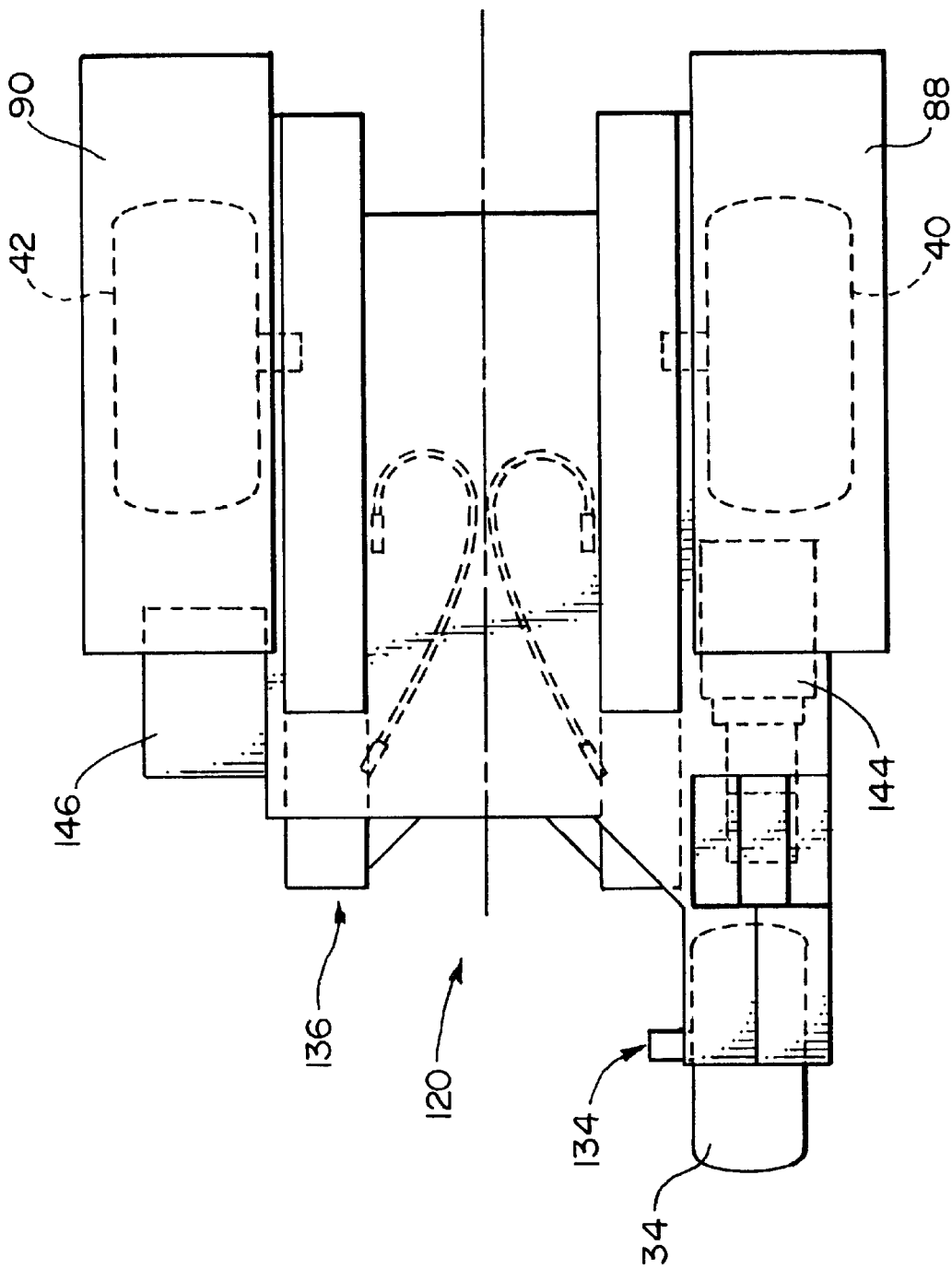

HARVESTING SYSTEMS AND METHODS

RELATED APPLICATIONS

This application claims priority of U.S. Provisional Patent Application Ser. No. 60/074,471 which was filed on Feb. 12, 1998.

FIELD OF THE INVENTION

The present invention relates to harvesting systems and methods and, more specifically, to such machines and methods that are designed to harvest produce from upright plants arranged in generally parallel rows.

BACKGROUND OF THE INVENTION

Harvesting systems are commonly employed to harvest produce from plants that are arranged in generally parallel rows and which support produce above the ground. The produce from these plants will be generally referred to in this application as the "fruit" of the plant, although certain produce harvested by the machines and methods of the present invention may not technically be considered a fruit.

These crops typically have a vertically free-standing or supported bush, tree, or vine from which the fruit is suspended. When ripened, the fruit can easily be dislodged from the plant by beating the plant. Crops typically harvested with the harvesting systems and methods of the present invention include grapes, coffee beans, raspberries, and the like. The present invention is of particular importance as applied to a harvesting system for grapes, and that application will be discussed in detail herein; but the present invention may have broader application to other crops having similar characteristics. The scope of the present invention should thus be determined with reference to the claims appended hereto and not the following detailed description.

Harvesting systems for this type of plant typically comprise a carriage system, a motor system, a fuel system, a shaker system, and a collecting system. The carriage system provides a movable structure that supports the shaker system. The shaker system comprises two portions that define a shaker area. The collecting system is supported on the carriage system to define a collecting area spaced below the shaker area. The carriage system moves or is moved along a row of plants such that the shaker system can beat the plant to cause ripe fruit to fall. As the carriage system moves along the row, the collecting system is disposed under the plants such that it catches the falling fruit. The collecting area is elongate, with the length of the collecting area being determined by the speed at which the carriage system moves along the plants and the expected time it will take most if not all of the fruit to fall.

The carriage system of conventional harvesting systems comprises a frame, front and rear axles mounted on the frame, and two wheels mounted on each axle. The motor system is mounted on the frame and operatively connected to the rear wheels. The fuel system is also mounted on the frame and is operatively connected to the motor system. The motor turns the rear wheels to propel the carriage system, and the front two wheels are movable to allow the carriage system to be turned.

The elongate collecting area is symmetrically aligned on either side of and parallel to the row as the harvesting system begins harvesting the row. If the collecting area is not properly aligned with the row, the plants may be damaged and/or the fruits may not be properly dislodged from the plant and collected. The collecting system comprises storage bins in which collected fruit is stored; these storage bins are emptied when full or when harvesting is complete.

In a field, each row of plants is separated from adjacent rows by a what will be referred to herein as a row path. The field is typically divided into field portions that are separated by what will be referred to herein as field paths. Field paths extend along the edges of the field portions perpendicular to the row paths. The field paths define the space in which the operator must maneuver the harvesting system to align the harvesting area with a given row immediately prior to harvesting that given row.

More specifically, any given field path has a width dimension that is parallel to the row paths terminating in the given field path. This width dimension defines the amount of room in which the harvesting system may maneuver when leaving one row and turning one hundred and eighty degrees to another row and should, at a minimum, be longer than an effective length of the harvesting system.

Crop owners find it cost-effective to plant crops as densely as possible. The area taken up by field and row paths is thus typically minimized to maximize crop density. But minimizing the field and row paths reduces the area in which the operator may maneuver the harvesting system to align the collecting area with the next row to be harvested. The operator may maneuver the harvesting system into proper alignment with the rows by moving back and forth, but excessive maneuvering can significantly slow down the harvesting operation.

Accordingly, with conventional harvesting systems, a crop owner must layout the crops in a manner that represents a compromise between increasing crop density and decreasing harvest times. The need thus exists for harvesting systems that provide the crop owner with more flexibility to optimize both crop density and harvest times.

RELATED ART

The following patents were uncovered during a professional patentability search conducted on behalf of the applicants.

U.S. Pat. No. 2,783,605 to Heleen, U.S. Pat. No. 1,725,382 to Trufant, and U.S. Pat. No. 1,323,928 to Tervo all disclose cranberry harvesters employing a three-wheel configuration. These patents all deal primarily with the apparatus for picking cranberries. The Heleen and Trufant patents contain almost no mention of the wheel configuration.

The Tervo patent briefly mentions that the machine has wheels with broad treads for travel over boggy ground and contains the following language: "although I have shown a single front wheel, it is obvious that a pair of front wheels might be employed" (col. 2, line 74). The Tervo patent thus teaches that the three-wheel configuration is not a critical component of the machine described therein.

The Heleen, Trufant, and Tervo patents do not contain any disclosure, teaching, or suggestion that a three-wheel configuration yields significant benefits in cranberry harvesting or that this wheel configuration would have broader application to any other crop.

To the contrary, the nature of harvesting cranberries is so unique that any reasons for using a three-wheeled configuration on a cranberry harvester would have no application to harvesting machines for other crops. In particular, cranberries grow in clusters on low-lying vines in bogs. Cranberries that are processed into juice and the like are harvested by a flooding process. Berries for the fresh market are harvested dry, using mechanical harvesters; a mechanical harvester 'combs' the berries off the vines. The Heleen, Trufant, and Tervo patents relate to such "dry" cranberry harvesters.

Given the nature of cranberry plants, it appears that a single front wheel is employed by the cranberry harvesters disclosed in the Heleen, Trufant, and Tervo patents primarily to avoid crushing cranberries before they have a chance to be picked. Elimination of a second front wheel further obviates the need for an axle or shaft between the two wheels and thus simplifies the construction of the harvester.

These reasons would in no way motivate one of ordinary skill in the art to use a single wheel for a harvester designed to harvest fruit from vertical plants arranged in rows. With row crops, the wheels travel on paths between the rows and thus crushing fruit is not a significant problem. And given that the front wheels of conventional row harvesters are arranged on either side of the row, such row harvesters could not make use of an axle or shaft in any case.

In addition, cranberries plants are not vertical plants and are not grown in rows. The cranberry harvesters disclosed in the Heleen, Trufant, and Tervo patents thus do not relate to the harvesting of row crops such as those harvested by the present invention. In particular, these patents do not disclose a machine having portions arranged on either side of a row with an entryway through which the plants pass relative to the harvester. The Heleen, Trufant, and Tervo patents thus do not teach one of ordinary skill in the art that a three-wheel configuration may have any benefits in the context of harvesting row crops.

The Heleen, Trufant, and Tervo patents thus do not disclose, teach, or suggest the present invention. Further, the differences between cranberry harvesting and the harvesting of row crops are such that one of ordinary skill in the art would not be motivated to combine the three-wheeled configurations disclosed therein with conventional harvesters for row crops.

The search conducted on behalf of the applicants also uncovered the following U.S. Pat. No. 4,970,850 to Devries; U.S. Pat. No. 4,750,322 to Korthuis (also assigned to the assignee of the present application); U.S. Pat. No. 3,672,140 to Furford; U.S. Pat. No. 2,671,301 to Harrison; and U.S. Pat. No. 1, 629,831 to Maglathlin. These references are no more relevant than the references cited above and will be discussed herein only briefly.

The Devries patent deiscloses a blueberry harvesting machine adapted to be attached to a tractor. A single front wheel is arranged on one side of the machine, and the other side is supported by the tractor.

The Korthuis patent discloses a harvesting machine adapted to harvest vertical row crops using a three-wheel configuration. This wheel configuration is different from that of the present invention, and this reference does not recognize or solve the maneuverability problems discussed above.

The Furford and Harrison patents disclose cranberry harvesters having a tricycle chassis using a central front wheel. This configuration is clearly unsuitable for use as a row crop harvester.

The Maglathlin patent discloses a three-wheel cranberry harvester employing a two front wheels and a single central rear wheel.

OBJECTS OF THE INVENTION

From the foregoing, it should be apparent that one primary object of the present invention is to provide improved systems and methods for harvesting produce.

Another more specific object of the present invention is to provide harvesting systems and methods that exhibit a favorable mix of the following characteristics:

increases crop density by allowing field path widths to be minimized;

decreases harvest times by allowing increased harvesting speeds and minimizing the amount of maneuvering required when moving from one row to another row;

provides a stable platform for the shaker and collecting assemblies; and does not significantly affect production costs.

SUMMARY OF THE INVENTION

These and other objects are obtained by the present invention, which is a harvesting system comprising a carriage system, motor system, fuel system, shaker system, and collecting system. The carriage system comprises a frame, first and second rear axles connected to first and second rear wheels, and a front axle connected to a single front wheel. The rear wheels are operatively connected to the motor system to propel the harvesting system in a direction of travel. The front axle is movable to allow the front wheel to turn and thereby change the direction of travel of the harvesting system.

The locations of various components of the harvesting system are determined to provide a center of gravity that is located within a triangular region defined by the axes of the three wheels.

In one preferred embodiment, the collecting system defines a collecting area, and the shaker system defines a shaker area spaced above the collecting area. The front wheel is arranged to one side and to the front of the collecting area. The front wheel is also spaced in front of and slightly inwardly from one of the rear wheels, and the center of gravity of the motor is located substantially along and slightly inside of a line extending between the front wheel and the rear wheel on the same side as the front wheel. The storage bins of the collecting system are symmetrically mounted on either side of the collecting area. The fuel tank of the fuel system is located approximately midway between the front and rear axles on the side of the collecting area opposite the front wheel. This arrangement of components yields an overall center of gravity that is located slightly towards the rear and to one side of the harvester and thus within the triangular region defined by the wheels.

The use of three wheels allows the harvesting system to turn one hundred and eighty degrees from one row to another row using a field path having a significantly smaller width dimension than is required by conventional harvesters. The placement of the various components of the harvesting system of the present invention provides a stable platform for conveying the beating and collecting systems.

DESCRIPTION OF THE DRAWING

FIG. 7 is a top plan view depicting a method of using the harvesting system of FIG. 1 to harvest fruit from a given configuration of crop rows;

FIG. 8 is a top plan view depicting the prior art method of using a conventional harvesting system to harvest fruit from the same configuration of crop rows as shown in FIG. 7;

FIG. 11 is a front elevational view depicting the harvesting area defined by the carriage system of the present invention;

FIG. 12 is a schematic, top plan view showing the relationships among certain components of the harvesting system of the present invention.

DETAILED DESCRIPTION OF THE PREFERRED EMBODIMENT

Figure 1:
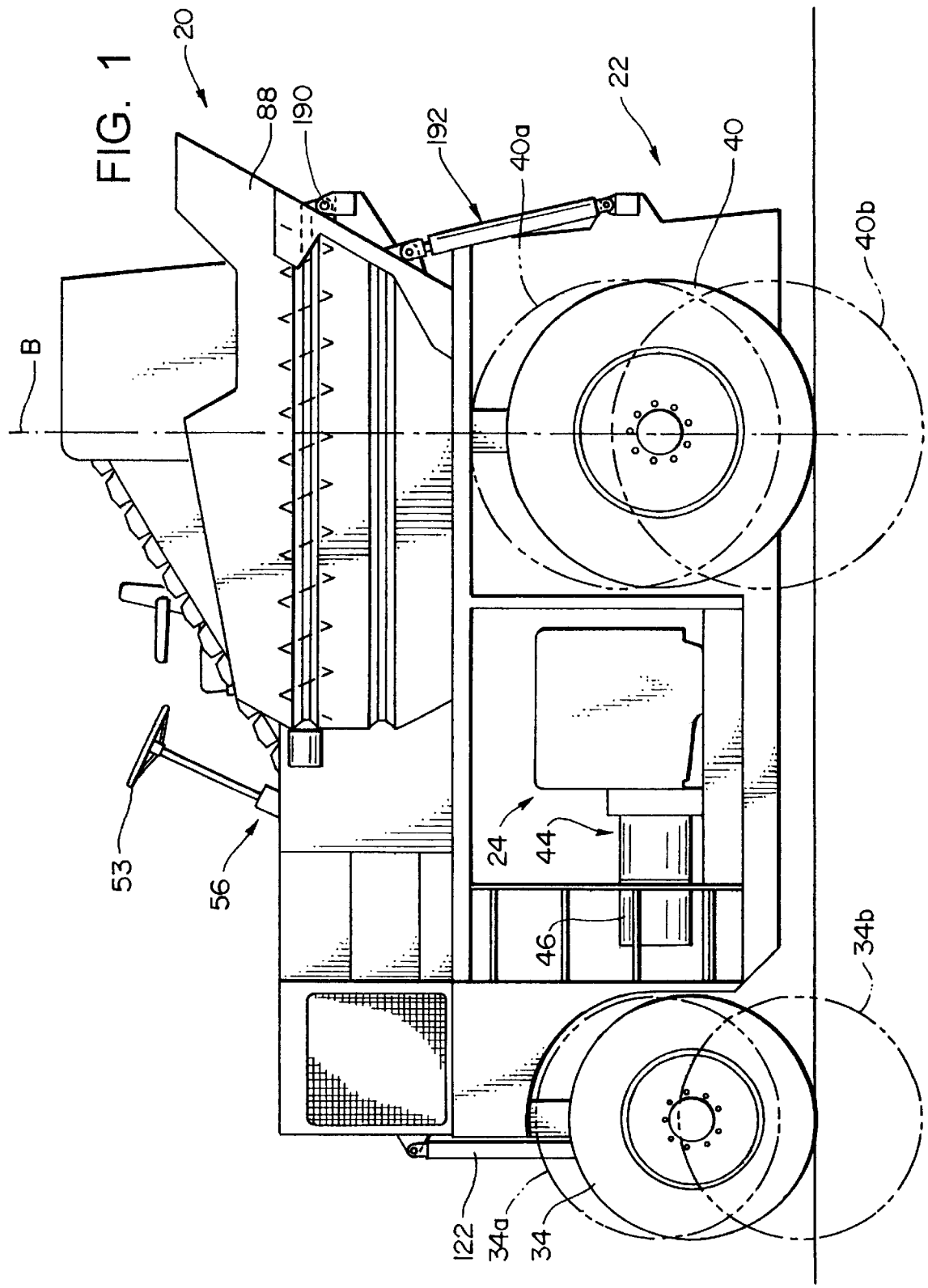
FIG. 1 is a side, elevational view of a harvesting system constructed in accordance with, and embodying, the principles of the present invention.

Referring now to the drawing, depicted at 20 in FIGS. 1, 2, 4, and 5 is a harvesting system constructed in accordance with, and embodying, the principles of the present invention. The harvesting system 20 is optimized to harvest grapes from vertically standing grapevines arranged in elongate, parallel rows as will be described in detail below.

To facilitate an understanding of the present invention, the following discussion will employ a number of relative terms to describe the harvesting system 20. In particular, the terms "front", "rear", "left", "right", "top", and "bottom" will refer to these directions with respect to the harvesting system 20 as depicted in FIG. 1. A longitudinal system axis A (FIG. 2), a rear vertical axis B (FIGS. 1 and 5), front lateral axis C, rear lateral axis D, vertical front wheel axis E, longitudinal front wheel axis F, vertical right wheel axis G, collecting axis H, and left and right rear wheel longitudinal axes I and J are defined for the system. These axes are depicted in FIGS. 1, 2, 5, 9, and 10. The longitudinal axes extend from front to back, the lateral axes extend from side to side, and the vertical axes extend from top to bottom. The precise location of these axes will become apparent from the drawings and the following discussion.

Figure 4:
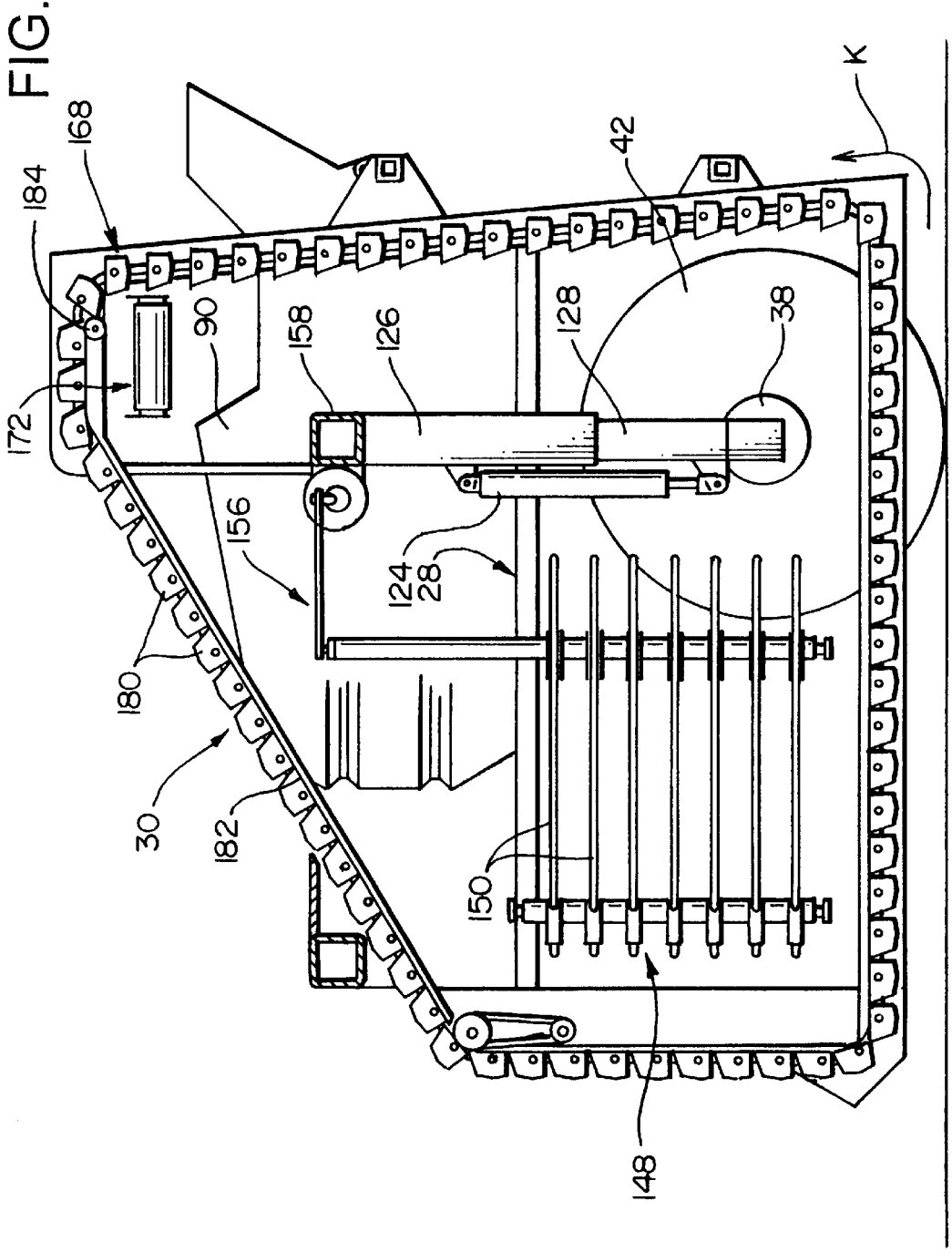
FIG. 4 is a side, cutaway, elevational view depicting the shaker and collecting systems of the harvesting system of FIG. 1.
Figure 5:
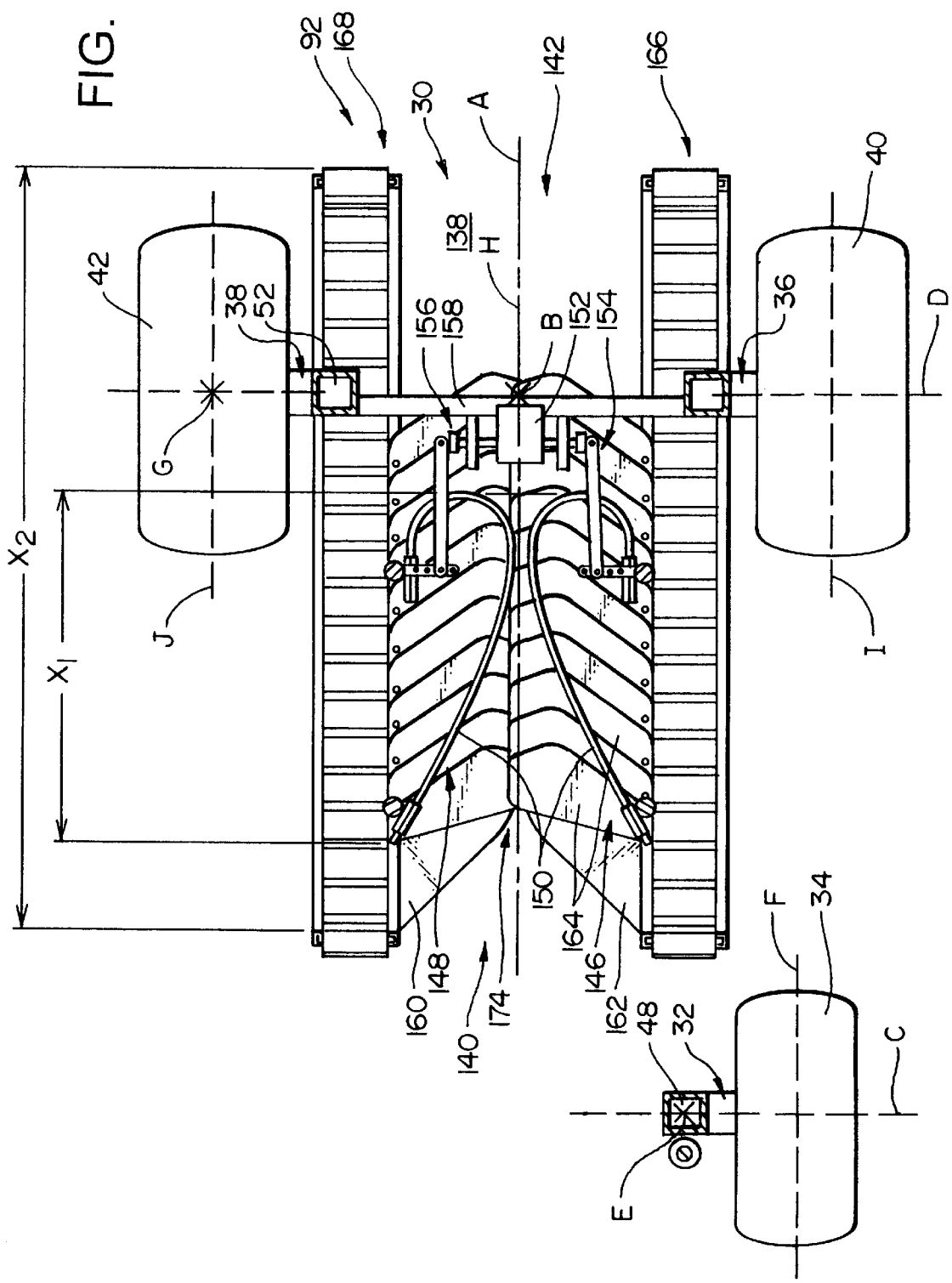
FIG. 5 is a top, cutaway, plan view depicting portions of the collecting system of the harvesting system of FIG. 1.

The harvesting system 20 comprises a carriage system 22, an engine system 24 (FIG. 1), a fuel system 26 (FIG. 2), a shaker system 28 (FIGS. 4 and 11), and a collecting system 30 (FIGS. 4 and 5). The carriage system 22 is adapted to support the engine system 24, fuel system 26, shaker system 28, and collecting system 30 in a manner that allows the engine system 24 to transport and operate the shaker system 28 and collecting system 30.

As perhaps best shown in FIGS. 1, the carriage system 22 comprises a front axle 32 that supports a single front wheel 34 and first and second rear axles 36 and 38 that support first and second rear wheels 40 and 42, respectively.

The engine system 24 is operatively connected to a hydraulic system 44 (FIG. 1). The hydraulic system 44 comprises a hydraulic pump 46 that is operatively connected to hydraulic motors 48, 50, and 52 (FIG. 5); the hydraulic motors 48, 50, and 52 are connected to the front axle 32 and the first and second rear axles 36 and 38, respectively. The hydraulic system 44 transmits rotational output of the engine system 24 to the wheels 34, 40, and 42. A steering wheel 53 is operatively connected to the front axle 32 by a steering system 56.

Operating the engine system 24 causes the front wheel 34 to rotate about the front axle 32, which is aligned with the front horizontal axis C, and the rear wheels 40 and 42 to rotate about the rear axles 36 and 38, which are aligned with the rear horizontal axis D. The engine system 24 thereby propels the harvesting system 20 forward and backward along the longitudinal system axis A. The front wheel 34 may be turned so that it extends at an angle α relative to the longitudinal system axis A. Turning the steering wheel 53 causes the front axle 32 to be turned about the vertical front wheel axis E and thus turns the harvesting system 20.

Figure 3:
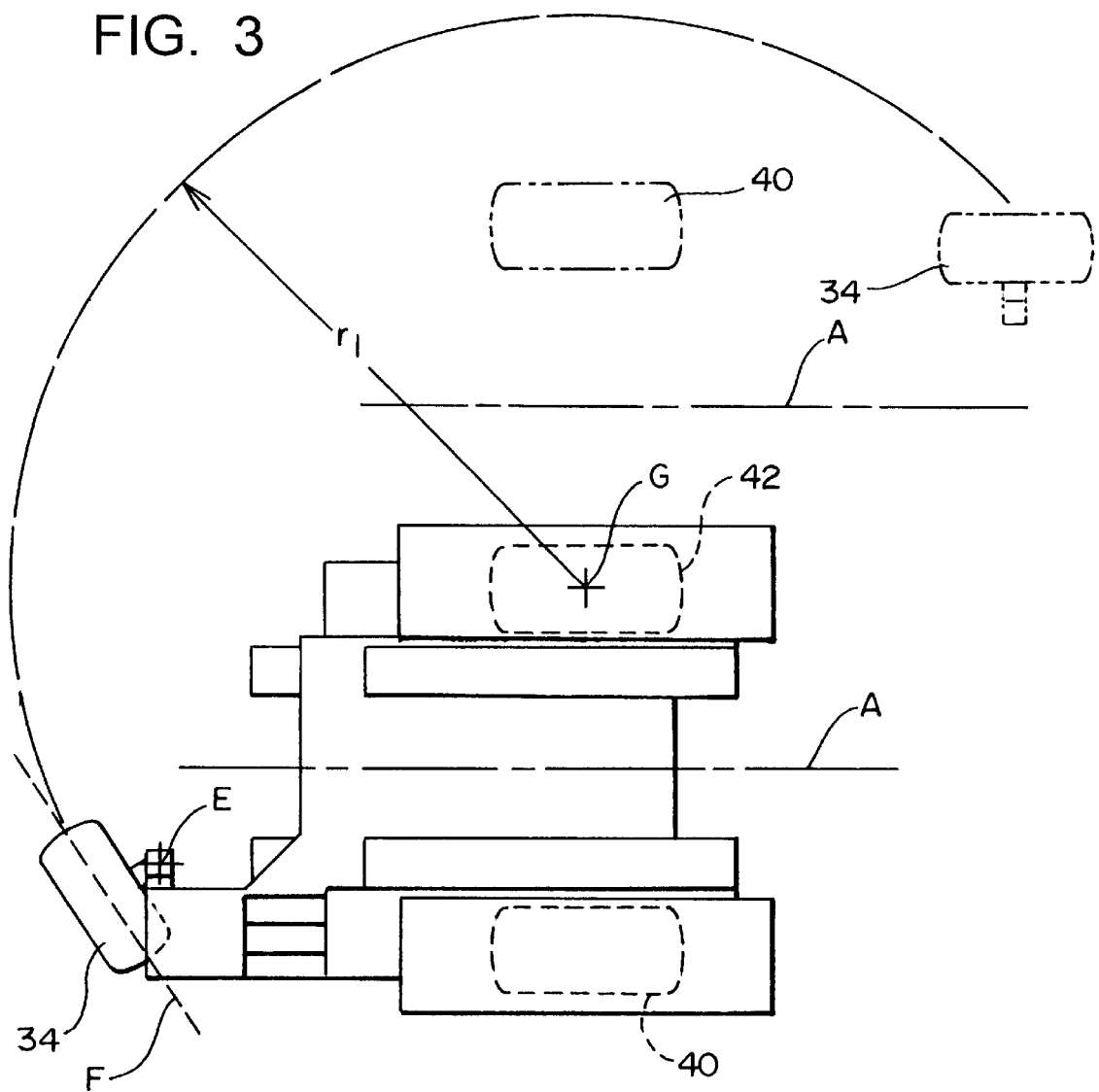
FIG. 3 is a top plan view depicting the turning radius of the system of FIG. 1.

A minimum turning radius "r1" as shown in FIG. 3 represents the tightest turn that may be executed by the system 20. The harvesting system 20 is designed such that it may pivot about the vertical right rear wheel axis G extending through the second rear wheel 42; the minimum turning radius "r1" thus corresponds to a distance between the longitudinal front wheel axis F and the vertical right rear wheel axis G when the front wheel 34 is fully turned as shown in FIG. 5. Accordingly, as shown in FIG. 3 the use of the single turning front wheel 34 and two coaxially aligned rear wheels allows the harvesting system 20 to pivot about the vertical right rear wheel axis G extending through the rear wheel 42.

Because the system 20 can pivot about the rear wheel 42, the front wheel 34 may be placed farther away from the rear wheels 40 and 42 (resulting in a longer wheelbase) than was possible in prior art harvesting systems. Accordingly, although only three wheels are employed by the present invention, the system 20 is stable while still yielding a significantly sharper turning radius than prior art harvesters employing four wheels and a shorter wheelbase.

To obtain the primary benefits of the present invention, the system 20 should be limited to harvesting patterns requiring turns only in one direction; in the case of the system 20, the harvesting pattern should require only right hand turns. With this minor limitation, the minimum turning radius "r1" can be kept very small.

The harvesting system 20 is thus highly maneuverable and very little space is required for the system 20 to execute a 180° turn. In the context of harvesting a typical row crop, this maneuverability is of significant benefit. Referring to FIG. 7, depicted therein is a field 60 comprising first and second field portions 62 and 64. In FIG. 7, the first field portion 62 is being harvested. The field portions 62 and 64 are separated by a field path 66, which is a rudimentary road or truck path that allows access to the individual field portions 62 and 64.

The field portions are divided into rows, with the first field portion 62 comprising first, second, third, and fourth rows 68, 70, 72, and 74. As described above, each row has a row axis and, at any given point along the length of the rows, the row axes are substantially parallel to each other. The axes of the first and fourth rows are indicated by broken lines 76 and 78 in FIG. 7. The individual rows are separated by row paths, and, as shown in FIG. 7, the rows 68, 70, 72, and 74 are separated by row paths 80, 82, and 84. The rows comprise individual plants 86.

The harvesting system 20 harvests the fruit by moving along each row such that the shaker system 28 can dislodge the fruit from the plants 86 and the collecting system 30 collects the fruit in storage bins 88 and 90 (FIGS. 1, 2, and 6) forming a part of the collecting system 30. As it moves along a given row, the system 20 straddles the row so that the single front wheel 34 and first rear wheel 40 are in the row path on one side of the row and the second rear wheel 42 is in the row path on the other side of the row. Each plant 86 is thus harvested in one pass.

The harvesting system 20 is designed to allow the crops in the field 60 to be harvested as quickly as possible and with as little crop waste and/or damage to the plants as possible. To accomplish this, the harvesting system 20 represents a balance of a number of design parameters.

An important characteristic of the harvesting system 20 is the linear speed, or harvesting speed, at which the system 20 can move along the rows. As the harvesting system 20 will, a majority of the time, be moving along rows harvesting crops, the harvesting speed is a primary factor in determining the effectiveness of the harvesting system 20.

Another important characteristic of the harvesting system 20 is the time in which it can execute the 180° turn required to move from one row to another row. While harvesting a given field, the harvesting system 20 will spend the next greatest percentage of its time moving from row to row.

Another important characteristic of the harvesting system 20 is the time that it takes to empty the bins in which harvested fruit is temporarily stored. More particularly, during harvesting these bins will become full and must be emptied. The process of emptying these storage bins must be quick so that the system may return to the rows to continue harvesting.

Referring initially to the harvesting speed, the rotational output of the hydraulic motors 48, 50, and 52 can most directly affect the harvesting speed, but the hydraulic motor output is usually not a limiting factor in determining harvesting speed. Practically speaking the characteristics of the shaker system 28 and collecting system 30 present more significant limitations on harvesting speed.

The shaker system 28 must be moved along such that the system 28 contacts the plants with sufficient force and in an appropriate manner to dislodge the fruit from the plants but without excessive force that may damage the plants. Clearly, moving the shaker assembly 28 along a row at high speeds may result in damage to the plants.

Effective lengths "x1" and "x2" (FIG. 5) of the shaker assembly 28 and collecting system 30, respectively, are directly related to harvesting speed. A shaker assembly will occupy a minimum volume necessary for the shaker assembly to effectively dislodge a desired percentage of ripe fruit from a plant; this minimum volume is defined by a set of dimensions. One of these dimensions is the effective length "x1", which is the length component of the shaker assembly 28. The effective length "x2" of the collecting system 30 at a minimum must be sufficient to collect the fruit dislodged by the shaker system 28. The effective length "x2" of the collecting system 30 also includes the length of a conveyor system 92 that conveys collected fruit to the storage bins 88 and 90.

The collecting system thus must at a minimum extend completely underneath the shaker system 28. The exemplary collecting system 30 extends slightly in front of the shaker system 28 to catch fruit dropping in front of the shaker system 28. If the collecting system is too short for a given harvesting speed, some of the fruit may not fall quickly enough to be collected by the collecting system before the harvesting system moves past the falling fruit. The exemplary collecting system 30 thus also extends behind the shaker system 28 a distance that, when the maximum harvesting speed and characteristics of the plant and fruit are considered, results in the collection of an acceptable percentage of the falling fruit dislodged by the shaker system 28.

From the foregoing, it should be apparent that the effective lengths "x1" and "x2" of the collecting system 30 are, for the purposes of the exemplary system 20, considered a given. And because the effective length "x2" is longer than the effective length "x1", one purpose of the present invention is thus to optimize the harvesting system 20 for a collecting system having a given effective length "x2".

As discussed above, another important characteristic of the harvesting system 20 is the transition time it takes to move from one row to another. An important factor in this transition time is the turning radius "r1" of the system 20. The minimum limit on the turning radius "r1" is determined at least in part by the effective length "x2" of the collecting system 30. While simply shortening the length of the carriage system employed will reduce the turning radius of the system, shortening the length of the carriage system may not be feasible given other concerns.

To provide maximum maneuverability, the turning radius "r1" should be kept as small as possible. As shown in FIG. 7, a tight turning radius allows a longitudinal collecting axis H of the collecting system 30 to be brought into alignment with the row axis 72 with minimal or no back and forth maneuvering of the system 20. And as long as the rows are harvested in a pattern that requires the system 20 to turn only in a direction opposite the side on which single front wheel 34 is placed, the front wheel 34 will not need to clear the row on the inside of the turn as the collecting axis H is brought into alignment with the row axis 72.

As shown by a comparison of FIGS. 7 and 8, the turning radius "r1" of the present invention is smaller than the turning radius "r2" of a prior art harvesting system (FIG. 8) having four wheels. This allows the harvesting system 20 to execute the 180° turn required to move from one row to another more readily than the prior art system. In the field 60, the wider turning radius "r2" of the prior art system would require that system to back up while leaving one row and also while entering the next row. This maneuvering will increase the time required to move from one row to the next and, over the course of harvesting the entire field, may significantly increase the time and fuel needed to harvest the entire field. The harvesting system 20 is much less likely to require stopping when moving from one row to the next.

FIG. 7 also shows that the rows 68 and 70 are too close together for even the harvesting system 20 to move from one row to the next row adjacent thereto. The operator will simply skip one or two rows and circle back to pick up one of the skipped rows the next pass; by skipping one or two rows as shown in FIG. 7, an entire field portion can be harvested executing only right hand turns and perhaps without stopping the harvesting system 20. The turning radius "r1" of the present invention thus allows an efficient harvesting pattern even though the rows are arranged too densely for the rows to be harvested sequentially.

Figure 6:
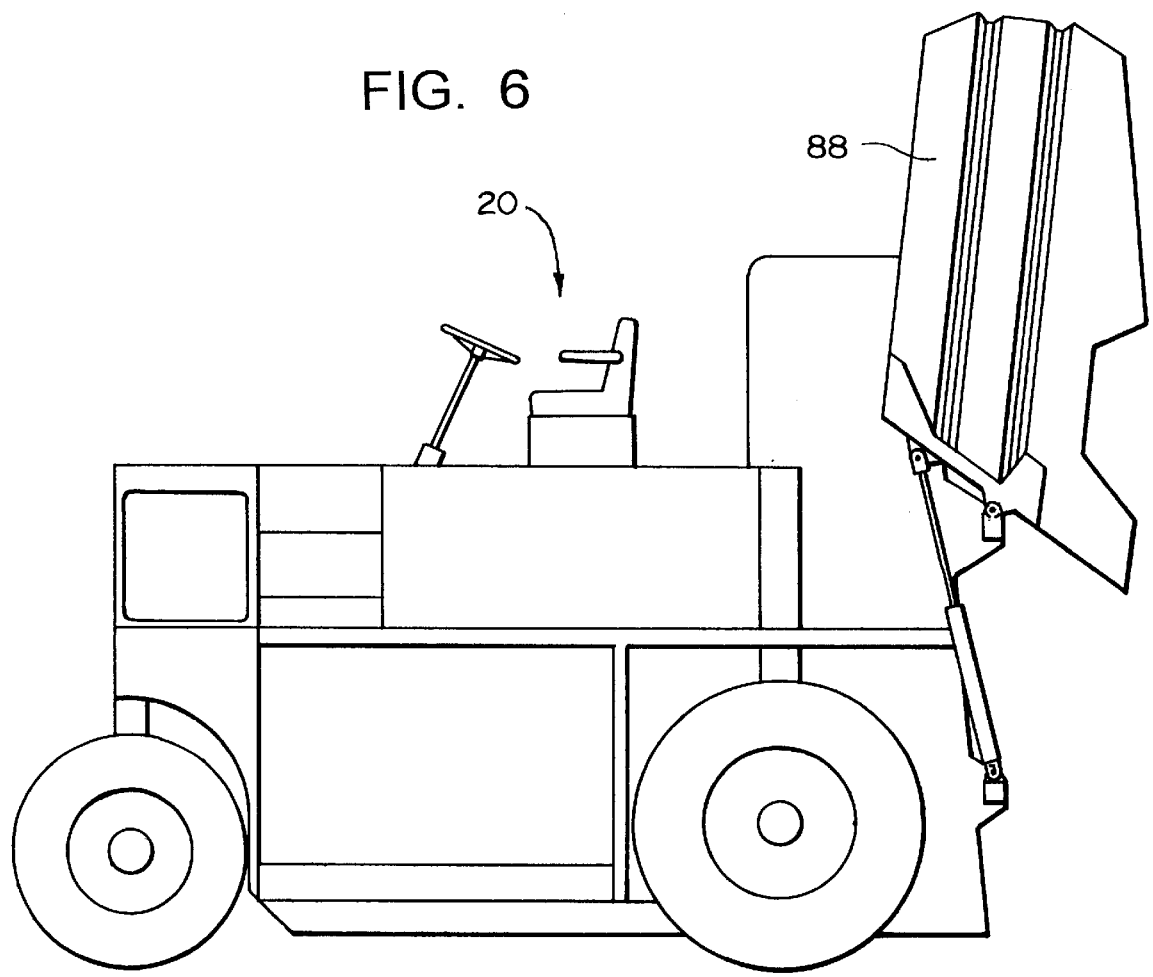
FIG. 6 is a side, elevational view depicting the storage bins of the collecting system in an upright configuration in which fruit is removed from the storage bins.

As discussed above, another factor that limits the time in which harvesting can be completed is the process by which the storage bins on a harvest system are emptied. In a first embodiment as shown in FIG. 6, the collecting system 30 comprises the storage bins 88 and 90, which are pivotably mounted above the rear wheels 40 and 42 so that they can be rotated upwardly towards the back of the system 20 as shown in FIG. 6. A truck bed or the like can be located behind the system 20 and the storage bins 88 and 90 rotated so that the fruit falls from the bins 88 and 90 and into the truck bed. This process can be accomplished quickly and thus does not significantly slow down the broader harvesting process.

In another embodiment, the storage capacity may be provided on a separate vehicle traveling near the system 20. In this case, a conventional conveying system referred to as an "over the row" arm is provided that conveys the fruit from the harvesting system 20 over the row adjacent thereto to the storage vehicle. Using this embodiment of the system 20, the system 20 never needs to be stopped; once one storage vehicle is full, another is simply substituted while the harvesting system is executing its 180° turn at the next field path. This second embodiment thus potentially allows the system 20 to operate in a continuous manner.

With the foregoing general understanding in mind, the operational details of the present invention will now be described.

I. The Carriage System

The carriage system 22 comprises a rigid frame 120 to which the other engine system 24, fuel system 26, shaker system 28, and collecting system 30 are attached. The frame 120 thus forms the structural heart of the harvesting system 20. The details of the frame 120 are not critical as long as the frame 120 is rigid but relatively lightweight, can adequately support the loads on the harvesting system 20, and allows the component systems 24–30 to be physically arranged as described herein.

The carriage system 22 further comprises the axles 32, 36, and 38 and wheels 34, 40, and 42 discussed above. And as shown in FIG. 1, the axles 32, 36, and 38 are attached to the frame 120 such that the wheels can be moved up and down relative to the frame. In FIG. 1, the wheels 34, 40, and 42 are shown in their home position by solid lines and in their uppermost (34a, 40a) and lowermost (34b, 40b) positions by broken lines. Three hydraulic actuators are configured to move the wheels between their uppermost and lowermost positions. One of these actuators is shown at 122 in FIG. 1 and another is shown at 124 in FIG. 4. The third actuator would be substantially the same as the actuator 124 but is not shown in the drawing.

FIG. 4 also shows that rigidly attached to the frame 120 is a guide member 126 and rigidly attached to the axle 38 is a slide member 128. Extension and retraction of the actuator 124 causes the slide member 128 to telescope in and out of the guide member 126, which causes the movement shown in FIG. 1. Similar guide members and slide members (not shown) are associated with the wheels 34 and 40. The effective height of the system 20 may thus be changed to accommodate plants 86 of different heights.

Figure 2:
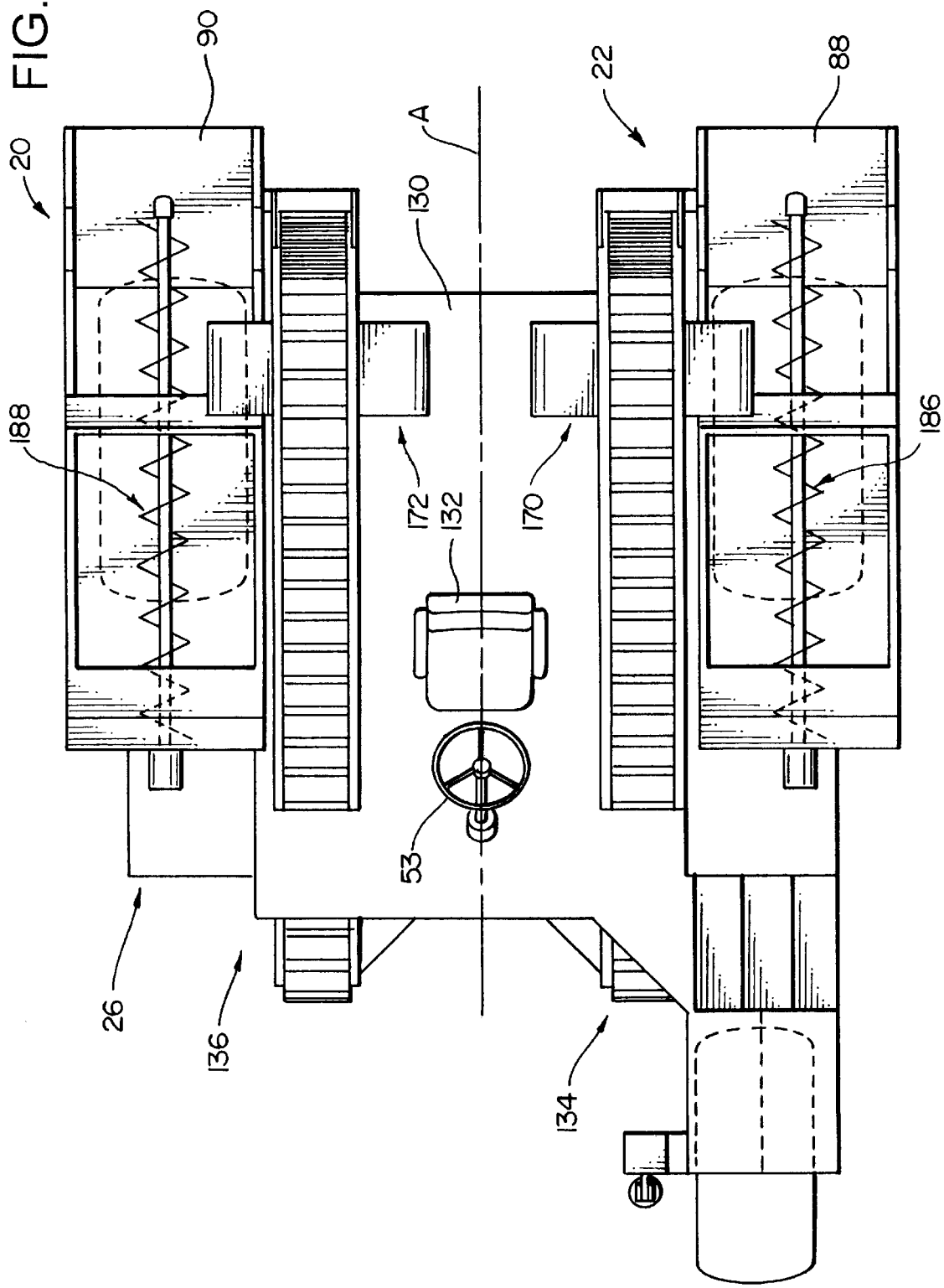
FIG. 2 is a top plan view of the system of FIG. 1.

As perhaps best shown in FIG. 2, the frame 120 further comprises a driver's platform 130 on which the steering wheel 52 and a driver's seat 132 are mounted. The platform 130 extends between first and second side portions 134 and 136 of the frame 120 such that the frame 120 is generally in the shape of an inverted "U".

The carriage assembly 22, and in particular the frame 120 thereof, thus defines a three-dimensional area 138 that will be referred to herein as the harvesting area. The harvesting area 138 is substantially symmetrically arranged about the collecting axis H described above and, as shown in FIG. 5, defines a throat portion 140 and a tail portion 142.

In addition to the axes A–H described above, left and right longitudinal rear wheel axes I and J (FIG. 5) are defined relative to the first and second rear wheels 40 and 42 of the carriage assembly 22. The left and right longitudinal rear wheel axes I and J are parallel to each other and to the longitudinal system axis A. These axes I and J are equidistant from the lateral axis A of the system 20, and the first rear wheel axis I is spaced slightly further away from the lateral axis A than the longitudinal front wheel axis F described above.

The carriage assembly 22 thus provides the rigid structure necessary to allow the various other components of the system 20 to be moved along the rows as described above.

II. The Engine System

The engine system 24 comprises an engine 144 (FIG. 12) that is rigidly attached to the first side portion 134 of the frame 120 between the front wheel 34 and the first rear wheel 40. The engine 144 is not per se part of the present invention, and any engine capable of generating sufficient power to energize the hydraulic system 44 as described below is suitable for use as the engine 144.

III. The Fuel System

The fuel system 26 comprises a fuel tank 146 (FIG. 12) that is rigidly attached to the second side portion 136 of the frame 120 in front of the second rear wheel 42. The fuel tank 146 is operatively connected to the engine 144 to supply an appropriate fuel to the engine 144. The fuel tank 146 is also not per se part of the present invention.

IV. The Shaker System

The shaker system 28 is perhaps best shown in FIGS. 5 and 11. The shaker system 28 comprises first and second groups 146 and 148 of shaker rods 150, a head crank assembly 152, and first and second linkage assemblies 154 and 156. The first and second shaker rod groups 146 and 148 extend from the first and second side portion portions, respectively, of the frame 120 into the harvesting area 138. The shaker rods 150 are elongate metal rods that are bent into a "C clef" shape with each end attached to the frame 120 such that the rods 150 can rock or sway up and down.

The head crank assembly 152 is attached to a cross-bar portion 158 of the frame 120. The head crank assembly 152 includes a hydraulic motor the output of which is transmitted through the linkage assemblies 154 and 156 to the shaker rods in the first and second shaker rod groups 146 and 148, respectively. The head crank assembly 152 thus causes the shaker rods 150 to vibrate with a magnitude and frequency that will dislodge ripe fruit from the plants 86. The exact magnitude and frequency at which the shaker rods are caused to vibrate may be adjusted depending upon such factors as the characteristics of the fruit being harvested and the conditions under which the fruit is harvested.

The shaker system 28 itself is not itself part of the present invention and other shaker systems may be substituted therefor depending upon the circumstances. The exemplary shaker system 28 is, however, particularly suited for the harvesting of grapes. The primary characteristics of any shaker system employed with the present invention is that the shaker system must be capable of being mounted onto the carriage system 22 as described above so that the shaker system can beat the plants to dislodge the fruit therefrom.

For example, another type of shaker system employs shaker rods that radially extend from a central shaft. The shaker rods rotate about the central shaft into the plant while vibrating the shaft up and down to dislodge the fruit. Such a shaker system employing rotating, vibrating shaker rods may be substituted for the shaker assembly 28 depending upon the circumstances.

The important aspects of any shaker system employed by the present invention include the ability to dislodge the type of fruit being harvested, the effective length of the shaker system, and the affect the shaker system has on harvesting speed.

V. The Collecting System

The collecting system 30 described above includes the storage bins 88 and 90, first and second inlet plates 160 and 162 (FIG. 5), a plurality of collecting ears 164 (FIG. 5), first and second bucket assemblies 166 and 168 (FIG. 5), and first and second cross belts 170 and 174 (FIGS. 2 and 11).

The inlet plates 160 and 162 are attached to the first and second side portions 166 and 168 of the frame 120 and define a throat area 174 that is aligned with the collecting axis H. As the system 20 moves along the rows, the main trunk portions of the plants 86 enter the throat area 174. The collecting ears 164 are rotatably connected to the frame portions 166 and 168. The collecting ears 164 are spring-biased into a normal position (FIG. 5) in which they extend below the shaker assembly 28. And as shown in FIG. 11, the upper surfaces of the collecting ears 164 form first and second collecting surfaces 176 and 178 onto which the fruit falls after it has been dislodged from the plants 86 by the shaker system 28. These surfaces 176 and 178 are slanted downwardly and outwardly as shown in FIG. 11 such that the collected fruit rolls towards the outermost portions of the collecting ears 164.

As the harvesting system 20 moves along the row, the ears 164 deflect or rotate slightly in succession to accommodate the trunks of the plants 86 and thus allow the plants 86 to pass through the harvesting area 138. But the ears 164 are spring-biased towards the normal position such that each ear returns to its normal position after it moves past the trunk portion of the plants 86. The collecting ears 164 are shaped to allow movement of the trunk relative to the system 20 as just described without creating gaps in the collecting surfaces 176 and 178 that are large enough or open long enough to allow a significant portion of the fruit to fall past the collecting surfaces 176 and 178 onto the ground.

As perhaps best shown in FIGS. 4 and 11, the bucket assemblies 166 and 168 comprise a plurality of buckets 180 that are arranged in a continuous loop that extends underneath the outermost edges of the collecting surfaces 176 and 178, respectively. Referring specifically to FIG. 4, the buckets 180 are carried by a carrying assembly 182 in a direction shown by arrow K. The buckets 180 are pivotably attached to the carrying assembly 182.

When the buckets are underneath the collecting surfaces 176 and 178, fruit falls from the collecting surfaces 176 and 178 into the buckets 180. The buckets 180 remain upright as they are carried up along the back of the carriage assembly 22. At the top of the carriage assembly 22, the buckets 180 are tipped by a tip member 184 such that any fruit therein is deposited on the cross belts 170 and 172. The cross belts 170 and 172 in turn carry the fruit outwardly and deposit the fruit into the collecting bins 88 and 90, respectively.

The collecting system 30 further comprises screw assemblies 186 to and 188 mounted within the bins 88 and 90 to ensure that fruit is evenly distributed within the collecting bins 88 and 90.

As perhaps best shown in FIG. 12, the storage bins 88 and 90 are located above the rear wheels 40 and 42. The weight of these bins 88 and 90, including the fruit therein, thus bears almost directly onto the relatively high load capacity rear wheels.

As discussed briefly above, the bins 88 and 90 move between a storage position (FIG. 1) and an unload position (FIG. 6). The bins 88 and 90 are in the storage position when the system 20 is harvesting the fruit, and fruit is removed from the bins 88 and 90 by moving the bins 88 and 90 into the unload position.

More specifically, FIG. 1 illustrates that the bins 88 and 90 are pivotably connected to the frame 120 by hinge pins 190.

Hydraulic actuators 192 are connected between the frame 120 and the bins 88 and 90 such that extending the effective length of these actuators 192 rotates the bins 88 and 90 from the storage position to the unload position.

The collecting system 30 thus collects and temporarily stores fruit harvested by the system 20 and allows this temporarily stored fruit to be off-loaded for transportation and further processing.

IV. The Hydraulic System

As discussed above, the hydraulic system 44 comprises the hydraulic pump 46, hydraulic motors 48, 50, and 52, and the hydraulic connections necessary to transmit pressurized hydraulic fluid from the pump 46 to the motors 48, 50, and 52. This system 44 also comprises additional motors as necessary to power the head crank assembly 152 of the shaker system 28 and the bucket assemblies 166 and 168 and screw assemblies 186 and 188 of the collecting system 30. The components that form the system 44 are conventional and will not be described in detail herein. The arrangement of these components to satisfy the functional and weight distribution goals of the present invention as described herein is not conventional, however.

V. Physical Arrangement of Various Components

To ensure that the harvesting system 20 is stable and performs its function as described above, the centers of gravity of the various components thereof are precisely located. The centers of gravity are shown in top plan view in FIGS. 9A and 10A and in side elevational view in FIGS. 9B and 10B. The following Table A cross-references the centers of gravity identified in FIGS. 9 and 10 with the components of the system 20, where a component has been specifically discussed above, its reference character is also provided in Table A.

Figure 9A:
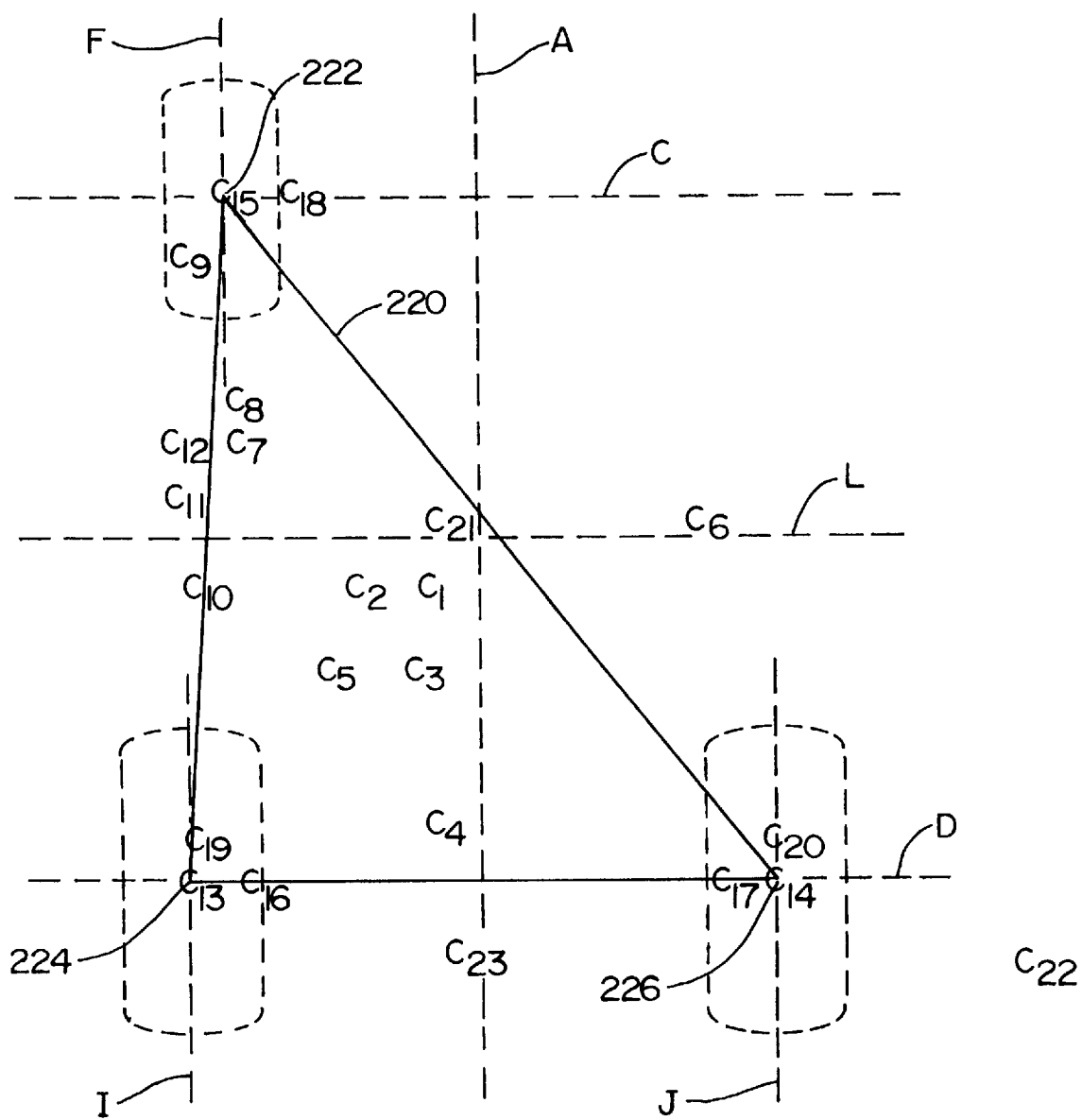
FIGS. 9A and 9B are highly schematic top plan and side elevational views, respectively, depicting the locations of the centers of gravity of the main components of a first embodiment of the present invention.
Figure 10A:
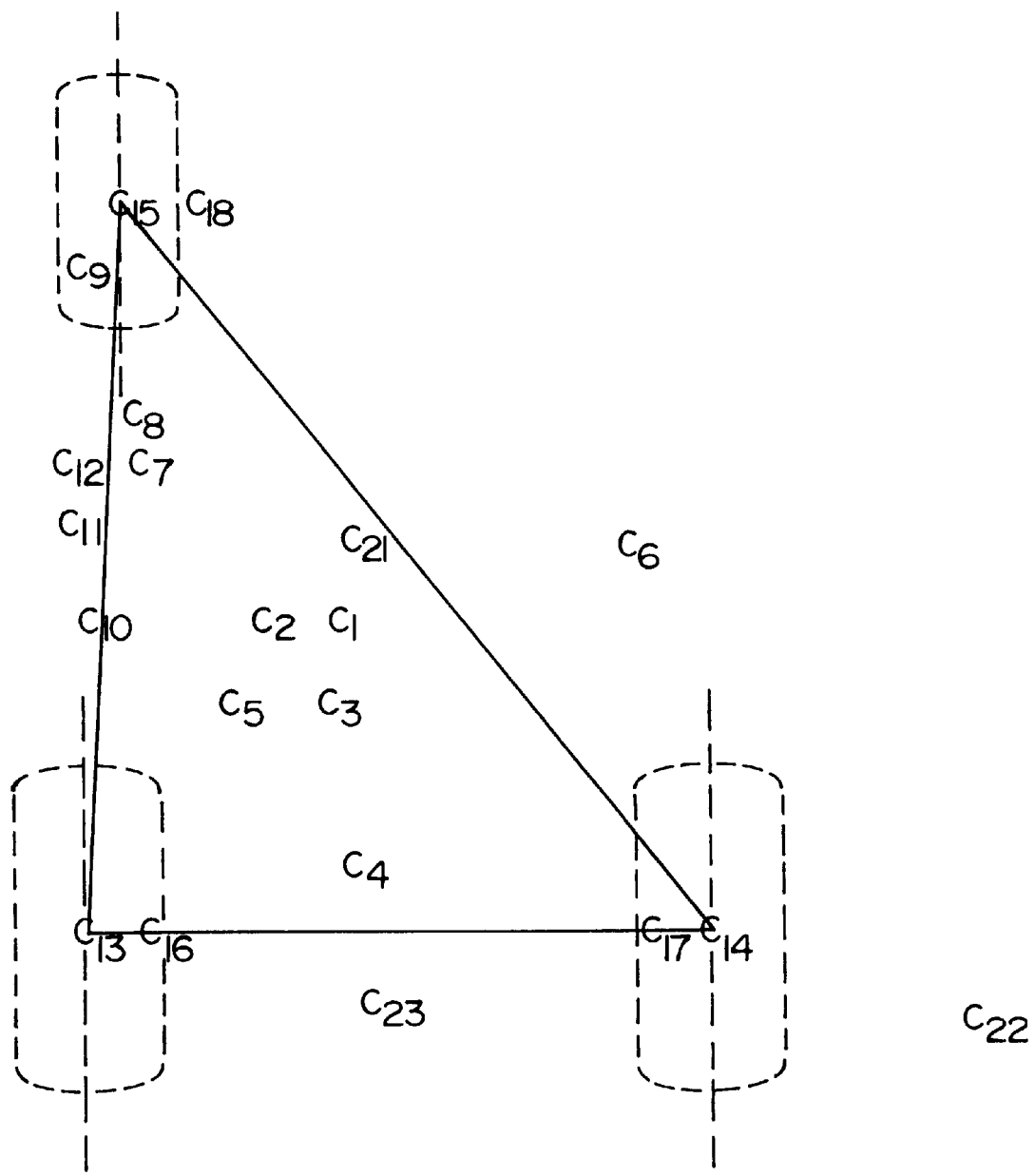
FIGS. 10A and 10B are highly schematic top plan and side elevational views, respectively, depicting the locations of the centers of gravity of the main components of a second embodiment of the present invention.

In particular, as shown in the top plan views of FIGS. 9A and 10A, these components are located such that the center of gravity C1 of the exemplary harvesting system 20 is: (a) located within a triangle 220 the corners of which are formed by the points of contact 222, 224, and 226 between the surface on which the system 20 is travelling and the wheels 34, 40, and 42, respectively; (b) spaced slightly to the rear of a midline L parallel to and equidistant from the front lateral axis C and rear lateral axis D; and (c) spaced slightly towards a strong side of the system 20 from the longitudinal system axis A, where the strong side of the system 20 is the side of the axis A on which the front wheel 34 is located.

Figure 9B:
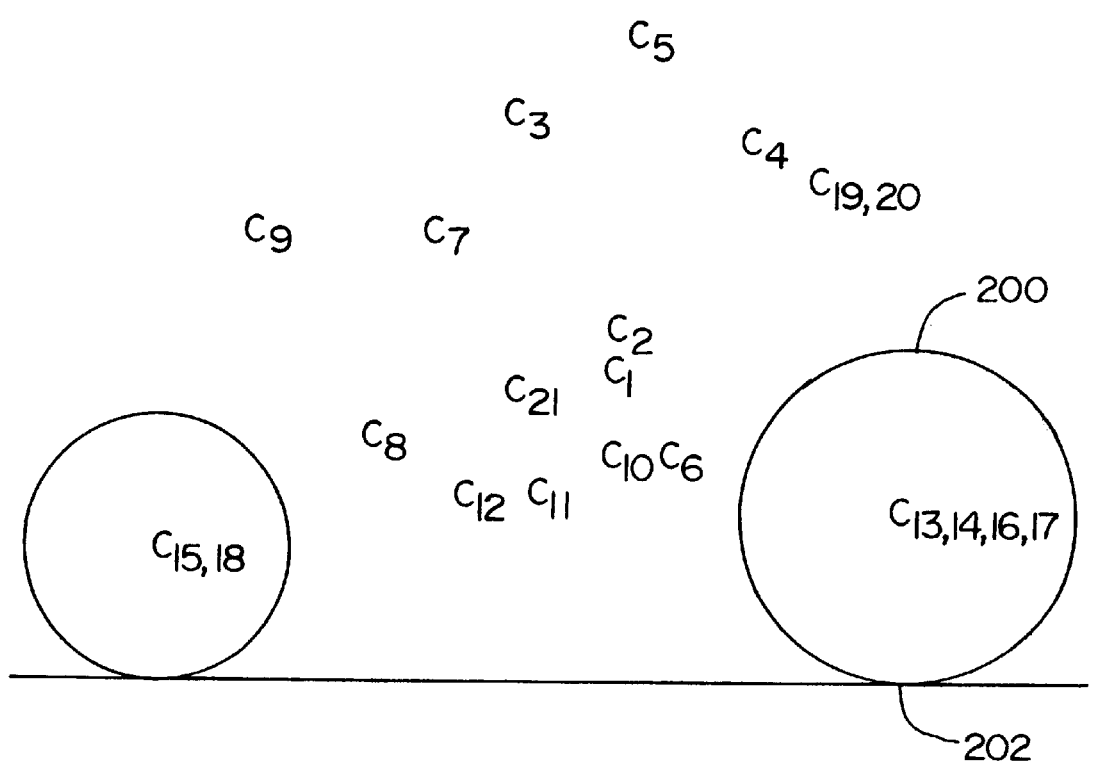
Figure 10B:
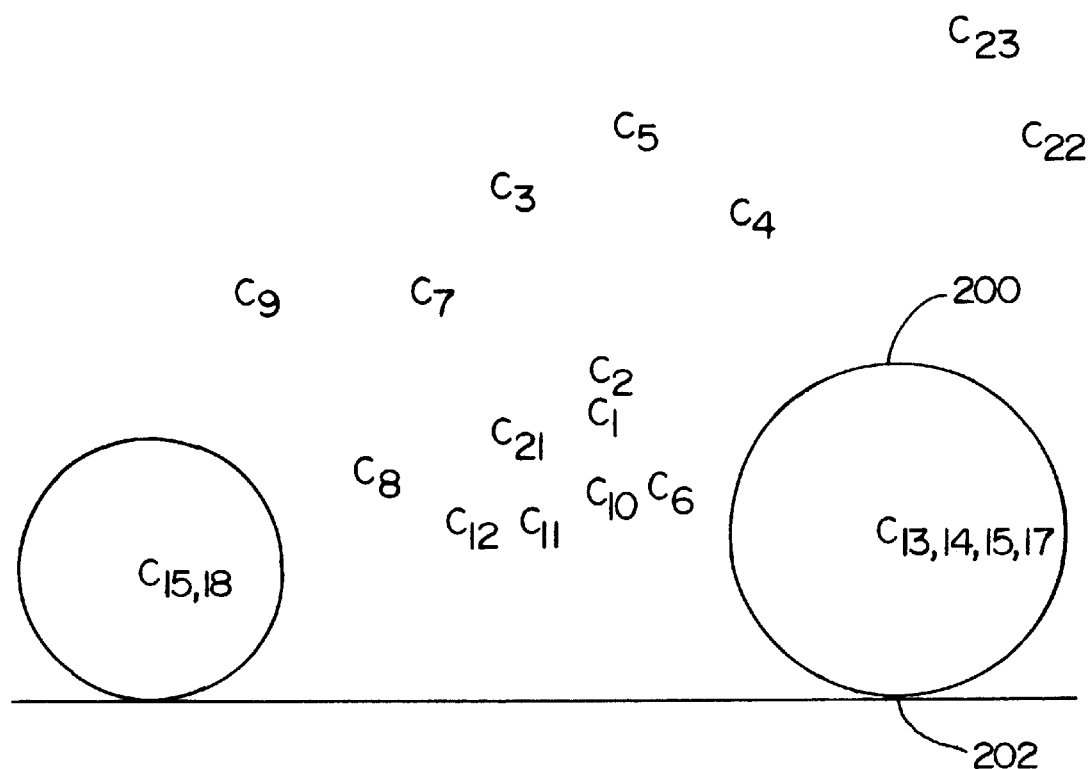
Figure 13:
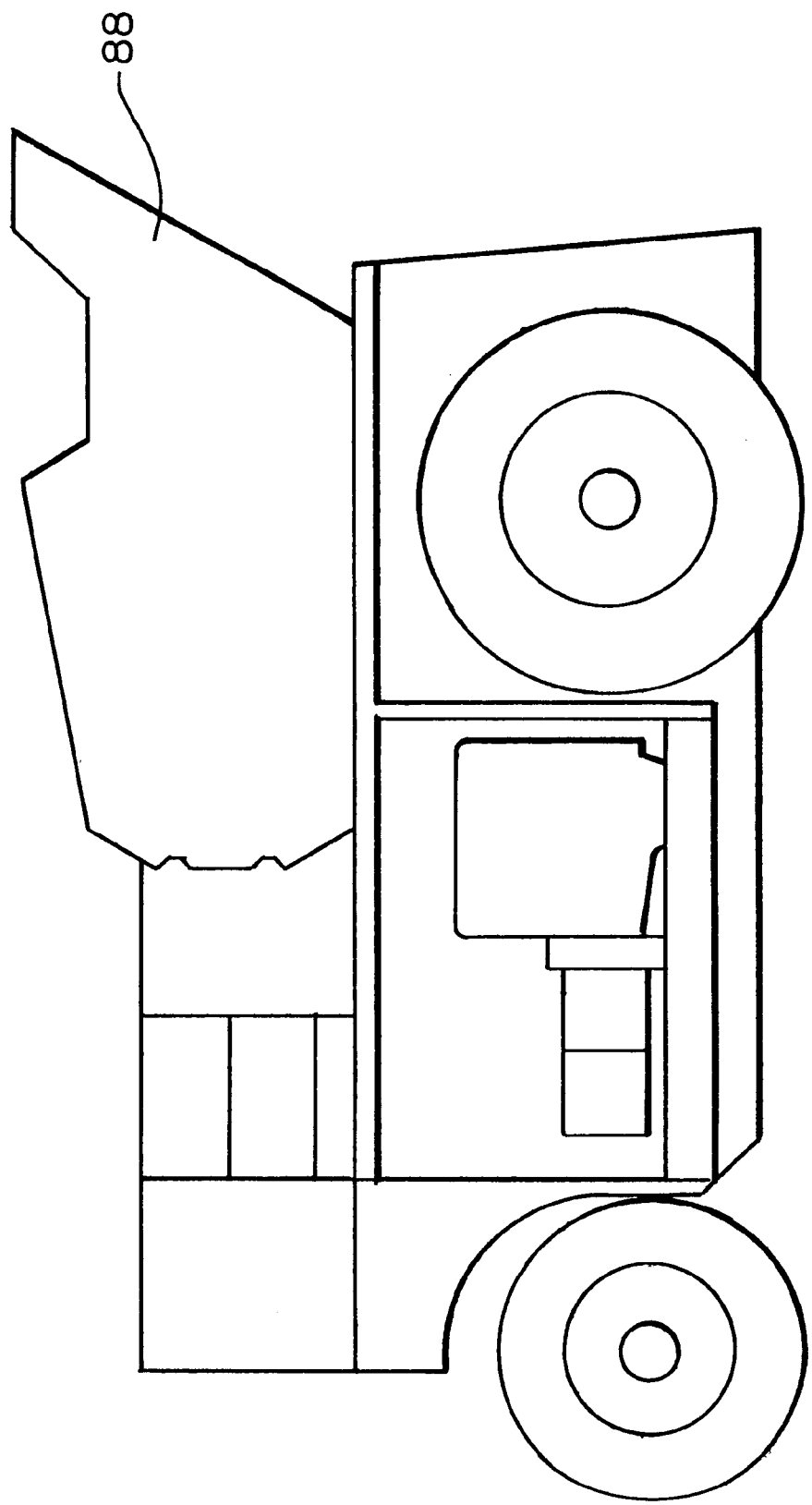
FIG. 13 is a side elevational view showing the relationships among certain components of the harvesting system of the present invention.

FIGS. 9B and 10B are side elevational views that show vertical placement of the system center of gravity C1. This placement is relative to the wheels being in their home position, with the understanding that the wheels can be moved from the home position as described above. FIGS. 9B and 10B show that the center of gravity C1 is located below an uppermost portion 200 of the rear wheel 40.

More specifically, the system center of gravity C1 is located in a three-dimensional region M defined by vertical planes extending through the midline L, the longitudinal system axis A, the right rear wheel longitudinal axis 1, and the rear wheel lateral axis D, and horizontal planes extending through the uppermost portion 200 and lowermost portion 202 of the rear wheel 40.

TABLE A

| Reference Character | Description of Component |
| --- | --- |
| C1 | Harvesting system 22 |
| C2 | Frame 120 |
| C3 | Driver's Platform 130 |

TABLE A-continued

| Reference Character | Description of Component |
|---|---|
| C4 | Head Crank Assembly 152 |
| C5 | Manifold |
| C6 | Fuel Tank 146 |
| C7 | Hydraulic Tank |
| C8 | Hydrostatic Manifold |
| C9 | Radiator |
| C10 | Engine 144 |
| C11 | Pump 46 |
| C12 | Pump |
| C13 | Left Rear Wheel 42 |
| C14 | Right Rear Wheel 40 |
| C15 | Front Wheel 34 |
| C16 | Hydraulic Motor 50 |
| C17 | Hydraulic Motor 52 |
| C18 | Hydraulic Motor 48 |
| C19 | Storage Bin 88 |
| C20 | Storage Bin 90 |
| C21 | Shaker System 28 |
| C22 | Over-the-row Assembly |
| C23 | Cross Belts 170, 172 |

I claim:

1. A harvesting system for harvesting fruit from upright plants arranged in substantially parallel rows, comprising:
   a carriage system comprising
      a frame comprising first and second frame portions,
      a front wheel mounted on the first frame portion,
      first and second rear wheels, where the first rear wheel is mounted on the first frame portion and the second rear wheel is mounted on the second frame portion,
      drive means for rotating at least one of the wheels to move the carriage system, and
      steering means for rotating the front wheel about a front wheel vertical axis;
   a shaker system for dislodging the fruit from the plants, where the shaker system is mounted on the frame of the carriage system; and
   a collecting system mounted on the frame of the carriage system under the shaker system for collecting fruit dislodged by the shaker system, where the collecting system defines an entryway through which the plants move relative to the carriage assembly; wherein
   the front wheel is attached to the frame in front of the entryway; and operating the steering means to rotate the front wheel about the front wheel vertical axis to turn the carriage means.

2. A harvesting system as recited in claim 1, in which the shaker system comprises first and second shaker portions mounted on the first and second frame portions, respectively, of the frame of the carriage system.

3. A harvesting system as recited in claim 1, in which the drive means comprises an engine and hydraulic system, where the engine is mounted on the first frame portion and is operatively connected to the wheels through the hydraulic system such that operation of the engine rotates the wheels.

4. A harvesting system as recited in claim 3, in which the hydraulic system comprises:
   a hydraulic pump mounted on the first frame portion and operatively connected to the engine; and first, second, and third hydraulic motors operatively connected to the front wheel and the first and second rear wheels, respectively, and to the hydraulic pump.

5. A harvesting system as recited in claim 1, in which the drive means comprises an engine, a fuel tank, and a hydraulic pump, where the engine and hydraulic pump are mounted on the first frame portion and the fuel tank is mounted on the second frame portion.

6. A harvesting system as recited in claim 1, in which the drive means comprises an engine, a fuel tank, and a hydraulic pump, the system further comprising first and second storage bins, where the engine, the fuel tank, the hydraulic pump, and the first and second storage bins are mounted on the frame such that, in a top plan view of the harvesting system, a center of gravity of the harvesting system is within a triangular region defined by the front wheel vertical axis and first and second rear wheel vertical axes extending through the first and second rear wheels, respectively.

7. A harvesting system as recited in claim 6, in which the center of gravity of the harvesting system is closer to the first rear wheel than to the second rear wheel.

8. A harvesting system as recited in claim 6, in which the center of gravity of the harvesting system is closer to the first rear wheel than the front wheel.

9. A harvesting system as recited in claim 7, in which the center of gravity of the harvesting system is closer to the first rear wheel than the front wheel.

10. A harvesting system as recited in claim 1, further comprising:
    a hopper system comprising first and second hopper portions mounted on the first and second frame portions, respectively; and
    a conveyor system comprising first and second conveyor portions mounted on the first and second frame portions to convey fruit collected by the collecting system to the hopper system.

11. A method of harvesting fruit from upright plants arranged in substantially parallel rows, comprising:
    providing a carriage system defining a system axis and comprising a frame comprising first and second frame portions, a front wheel, first and second rear wheels, a drive means for driving at least one of the wheels to propel the carriage system, and a steering assembly;
    mounting a shaker system on the frame of the carriage system;
    positioning a collecting system on the frame of the carriage system under the shaker system, where the collecting system defines an entryway;
    mounting the front wheel on the first frame portion at a location spaced in front of the entryway and such that operation of the steering assembly rotates the front wheel about the front wheel vertical axis;
    mounting the first rear wheel on the first frame portion and the second rear wheel on the second frame portion;
    operating the drive system while rotating the front wheel about the front wheel vertical axis to align the longitudinal system axis with a selected one of the rows;
    operating the carriage assembly such that the carriage moves along the selected one of the rows with the selected one of the rows disposed between the first and second frame portions;
    operating the shaker system to dislodge fruit from the plants; and
    operating the collecting system to collect fruit dislodged by the shaker system.

12. A method as recited in claim 11, in which the shaker system comprises first and second shaker portions, further comprising the step of mounting the first and second shaker portions on the first and second frame portions, respectively, of the frame of the carriage system.

13. A method as recited in claim 11, in which the step of providing the drive means comprises the steps of:
    mounting an engine on the first frame portion;

operatively connecting a hydraulic system between the engine and the wheels; and operating the prime motor to rotate the wheels through the hydraulic system.

14. A method as recited in claim 13, in which the step of operatively connecting the hydraulic system between the engine and the wheels comprises the steps of:

providing a hydraulic pump and first, second, and third hydraulic motors;

mounting the hydraulic pump on the first frame portion;

operatively connecting the first, second, and third hydraulic motors to the front wheel, the first rear wheel, and the second rear wheel, respectively; and operatively connecting the hydraulic pump to the engine and the first, second, and third hydraulic motors.

15. A method as recited in claim 11, further comprising the steps of:

mounting a engine and a hydraulic pump on the first frame portion;

mounting a fuel tank on the second frame portion;

operatively connecting the fuel tank to the engine; and operatively connecting the hydraulic pump to the wheels such that operation of the engine rotates the wheels.

16. A method as recited in claim 11, further comprising the step of mounting an engine, a fuel tank, a hydraulic pump, and first and second storage bins on the frame such that, in a top plan view of the harvesting system, a center of gravity of the harvesting system is within a triangle defined by first, second, and third vertical axes extending through the front wheel and the first and second rear wheels, respectively.

17. A method as recited in claim 16, further comprising the step of mounting the engine, fuel tank, hydraulic pump, and first and second storage bins on the frame such that the center of gravity of the harvesting system is closer to the first rear wheel than to the second rear wheel.

18. A method as recited in claim 16, further comprising the step of mounting the engine, fuel tank, hydraulic pump, and first and second storage bins on the frame such that the center of gravity of the harvesting system is closer to the first rear wheel than to the front wheel.

19. A method as recited in claim 17, further comprising the step of mounting the engine, fuel tank, hydraulic pump, and first and second storage bins on the frame such that the center of gravity of the harvesting system is closer to the first rear wheel than to the front wheel.

20. A method as recited in claim 11, further comprising the steps of:

mounting first and second hopper portions of a hopper system onto the first and second frame portions, respectively;

mounting first and second conveyor portions of a conveyor system onto the first and second frame portions, respectively; and operating the conveyor system to convey fruit collected by the collecting system to the hopper system.

* * * * *